(12) United States Patent
Voutchkov

(10) Patent No.: US 8,206,589 B2
(45) Date of Patent: Jun. 26, 2012

(54) DESALINATION SYSTEM AND METHOD FOR INTEGRATED TREATMENT OF BRACKISH CONCENTRATE AND SEAWATER

(75) Inventor: Nikolay Voutchkov, Stamford, CT (US)

(73) Assignee: Poseidon Resources IP LLC, Stamford, CT (US)

( * ) Notice: Subject to any disclaimer, the term of this patent is extended or adjusted under 35 U.S.C. 154(b) by 442 days.

(21) Appl. No.: 12/424,125

(22) Filed: Apr. 15, 2009

(65) Prior Publication Data

US 2010/0072136 A1    Mar. 25, 2010

Related U.S. Application Data

(60) Provisional application No. 61/099,840, filed on Sep. 24, 2008.

(51) Int. Cl.
*B01D 61/04* (2006.01)

(52) U.S. Cl. ............ 210/632; 202/82; 202/176; 203/10; 210/195.2; 210/259; 210/321.6; 210/170.11; 210/641; 210/652; 210/805; 210/806

(58) Field of Classification Search .................. 210/97, 210/137, 194, 175, 182, 195.2, 257.2, 258, 210/259, 321.6, 637, 641, 652, 774, 805, 210/806, 170.09, 170.11, 747.1, 747.5, 632; 203/10, 11; 202/82, 155, 174, 176; 261/110; 60/39, 203.1, 441.2, 648, 650, 690
See application file for complete search history.

(56) References Cited

U.S. PATENT DOCUMENTS

| | | |
|---|---|---|
| 4,083,781 A | 4/1978 | Conger |
| 4,141,825 A | 2/1979 | Conger |
| 5,076,934 A | 12/1991 | Fenton |
| 5,128,042 A | 7/1992 | Fenton |
| 5,238,574 A | 8/1993 | Kawashima et al. |
| 5,814,224 A | 9/1998 | Khamizov et al. |
| 6,187,200 B1 | 2/2001 | Yamamura et al. |
| 6,299,766 B1 * | 10/2001 | Permar ..................... 210/195.2 |
| 6,946,081 B2 | 9/2005 | Voutchkov |
| 7,037,430 B2 | 5/2006 | Donaldson et al. |
| 7,077,962 B2 | 7/2006 | Pipes |
| 7,081,205 B2 | 7/2006 | Gordon et al. |
| 7,083,730 B2 | 8/2006 | Davis |

(Continued)

FOREIGN PATENT DOCUMENTS

IL    67054 A    3/1989

(Continued)

OTHER PUBLICATIONS

Mushtaque Ahmed et al, "Use of evaporation ponds for brine disposal in desalination plants", Desalination 130 (2000), pp. 155-168.*
Robert R. Yamada et al, "Co-located seawater desalination/power facilities: practical and institutional issues", Desalination 102 (1995), pp. 279-286.*
Mike Mickley "Major Ion Toxicity in Membrane Concentrate", AWWA Research Foundation and American Water Works Association, 2000.

(Continued)

*Primary Examiner* — Joseph Drodge
(74) *Attorney, Agent, or Firm* — Dickstein Shapiro LLP

(57) ABSTRACT

Various embodiments described herein provide methods and apparatus for producing purified water from sea water or some other salty or brackish water source by using brackish concentrate mixed with salty water. The various embodiments also provide methods and apparatus for the treatment of toxicity of brackish concentrate, which brackish concentrate exhibits on aquatic life inhabiting the area of discharge of the brackish concentrate, as well as a method for environmentally safe disposal of brackish concentrate.

51 Claims, 3 Drawing Sheets

U.S. PATENT DOCUMENTS

| | | |
|---|---|---|
| 7,239,037 B2 | 7/2007 | Alstot et al. |
| 7,329,962 B2 | 2/2008 | Alstot et al. |
| 7,416,666 B2 | 8/2008 | Gordon |
| 7,455,778 B2 * | 11/2008 | Gordon .......................... 210/652 |
| 7,501,064 B2 * | 3/2009 | Schmidt et al. ................ 210/652 |
| 7,746,323 B1 * | 6/2010 | Otsuki et al. ................... 345/169 |
| 7,749,386 B2 * | 7/2010 | Voutchkov ..................... 210/652 |
| 2005/0029192 A1 * | 2/2005 | Arnold et al. .................. 210/641 |

FOREIGN PATENT DOCUMENTS

| | | |
|---|---|---|
| WO | WO 2006/106158 A1 | 10/2006 |

OTHER PUBLICATIONS

Mickley and Associates (2001), "Membrane Concentrate Disposal: Practices and Regulation" U.S. Department of the Interior, Bureau of Reclamation, Technical Services Center, Desalination and Water Purification Research and Development Program Report No. 69.

N. Voutchkov, "Novel Method for Assessing Salinity Tolerance of Marine Organisms" Environmental Engineer: Applied Research and Practice, Summer 2007, pp. 24-28, American Academy of Environmental Engineers.

* cited by examiner

DESALINATION SYSTEM AND METHOD FOR INTEGRATED TREATMENT OF BRACKISH CONCENTRATE AND SEAWATER

CROSS-REFERENCE TO RELATED APPLICATIONS

This application claims the benefit of U.S. Provisional Application No. 61/099,840, filed on Sep. 24, 2008, the subject matter of which is incorporated in its entirety by reference herein.

BACKGROUND

Embodiments described herein relate generally to improved systems and methods for the desalination of seawater and, more particularly, to methods and apparatus for the treatment and disposal of concentrate (brine) generated from brackish desalination plants by use in existing seawater desalination plants.

The desire to make drinkable, potable water out of seawater has existed for a long time. Several approaches can be taken to remove the salt and other chemicals. Voutchkov (U.S. Pat. No. 6,946,081) discloses a desalination system. The entire disclosure of U.S. Pat. No. 6,946,081 is incorporated herein in its entirety. Water distillation is one way to approach the goal, but may not be commercially feasible. In this approach, water is heated to separate the solids from the liquid and therefore remove the salt solids. Another approach is electrodialysis in which the ions forming the salt are pulled by electric forces from the saline water through membranes and thereafter concentrated in separate compartments. This approach is also very expensive. A third approach to desalination is through reverse osmosis. This method uses pressure to force salty feed water against membranes which allows the relatively salt free water to pass through, but not much of the salts or other minerals.

Brine (concentrate) is produced which is a by-product of part of a desalination system. Disposal of brine from brackish desalination plants is usually one of the key limiting factors associated with the wider implementation of inland brackish water desalination. Currently, in many locations worldwide brine from inland brackish desalination plants is disposed of most often by either deep well injection into high-salinity aquifers or by conveyance using a regional interceptor pipeline to a wastewater treatment plant (WWTP) and is discharged to the ocean using the treatment plant's ocean outfall. The first disposal method (i.e., disposal of concentrate to deep saline aquifers) is often limited and very dependent on the availability of such aquifer in the vicinity of the brackish desalination plants. In many cases such aquifers are not readily available. The second approach (i.e., brackish concentrate disposal through the outfall of an existing WWTP) is also very costly and more importantly, it occupies outfall capacity and thereby indirectly limits the treatment capacity of the host WWTP. Both alternatives treat brine from inland brackish desalination plants as waste and involve significant expenditures for the disposal of this brine. Currently, desalination of brackish water (i.e. water of total dissolved solids (TDS) concentration below 15,000 mg/L) is used widely for production of potable water and high-purity water for industrial applications. The brackish water desalination plants yield two streams: low-salinity product water and high-salinity waste stream (brackish brine or brackish concentrate). The brackish concentrate has to be disposed of or reused in an environmentally safe manner.

At present, the method most widely used for brackish concentrate disposal is direct or indirect discharge to surface waters without treatment (rivers, estuaries, ocean, etc.). Currently, more than 85 percent of the brackish desalination plants in the continental United States discharge their brackish concentrate to surface waters (See, for example, Mickley and Associates (2001) "Membrane Concentrate Disposal: Practices and Regulation", U.S. Department of the Interior, Bureau of Reclamation, Technical Services Center, Desalination and Water Purification Research and Development Program Report No. 69). A study completed by the American Water Works Research Foundation (See, for example, Mickley, M. C. (2000) "Major Ion Toxicity in Membrane Concentrate", Denver, Colo., American Water Works Research Foundation.) indicates that discharge of brackish concentrate to surface waters frequently exhibits toxicity to marine aquatic species and, therefore, in most cases is no longer a viable method for concentrate disposal. At present, the brackish concentrate toxicity is a known and well documented problem. The United States Environmental Protection Agency and most State environmental protection agencies require monitoring and treatment of brackish brine to detoxify it prior to disposal. Existing methods for concentrate treatment and disposal such as: evaporation in man-made ponds; deep well injection in hypersaline aquifers; or treatment by mechanical evaporation and crystallization are very costly and/or are applicable for very small brackish water desalination plants due to site constraints.

Research completed on the toxicity of membrane treatment plant concentrates (brines) from various water sources indicates that treatment processes that produce toxic brine are: groundwater and brackish water reverse osmosis treatment plants, membrane softening plants, electrodialysis desalination plants, and electrodialysis reversal treatment plants. (See, for example, Mickley and Associates, 2000). This research also concludes that brackish concentrate toxicity is not caused by the membrane treatment process itself but results from the nature of the groundwater/brackish water source and its major ion makeup. In comparison to brackish concentrate, high-salinity concentrate generated during the desalination of seawater by reverse osmosis membranes does not exhibit toxicity (See, for example, Voutchkov, N. (2007) "Novel Method for Assessing Salinity Tolerance of Marine Organisms", Environmental Engineer: Applied Research and Practice, Summer 2007, pp. 24 to 28, American Academy of Environmental Engineers).

Each of these efforts may increase the efficiency of the desalination system, but these efforts may not sufficiently reduce the cost of the system for use for public water supply. What is needed is a desalination system that processes seawater into potable water more cost effectively for use for public water supply, which includes the disposal of brackish concentrate.

SUMMARY

The present invention provides methods and systems for disposing of and/or desalinating brackish concentrate. The various embodiments described herein may yield a reduction of the costs for production of fresh water from saline sources and reduce costs for brackish concentrate disposal.

In one embodiment described herein, an integrated seawater desalination system produces desalinated water from a blend of concentrate (brine) generated from one or more brackish water desalination plants (inland desalters) and seawater in a reverse osmosis (SWRO) or thermal desalination plant.

In one embodiment described herein, a method for purifying water includes mixing brackish concentrate and sea water to produce mixed water. The mixed water is desalinated at a desalination plant to produce a permeate having a lower salt concentration than the mixed water and a concentrate having a higher salt concentration than the mixed water.

In another embodiment described herein, a method for purifying water includes receiving a salty water having a total dissolved solids concentration of less than 33,500 mg/L at a desalination plant, receiving a second salty water having a total dissolved solids concentration equal to or greater than 33,500 mg/L at the desalination plant, and mixing the salty water and the second salty water to produced a mixed water. The mixed water is desalinated at the desalination plant to produce a potable permeate having a total dissolved solids concentration that is lower than the mixed water and a concentrate having a total dissolved solids concentration that is higher than the mixed water. The concentrate is output through an output of the desalination plant.

In another embodiment described herein, a method of producing potable water from a salty water includes providing brackish water to a first desalination plant and desalinating the brackish water at the first desalination plant to produce a first concentrate having a higher salt content than the brackish water and a first permeate having a lower salt concentration than the brackish water. The first concentrate and seawater are provided to a second desalination plant. The first concentrate and the sea water are mixed to produce a mixed water. The mixed water is desalinated at the second desalination plant to produce a second concentrate having a higher salt content than the mixed water and a second permeate having a lower salt concentration than the mixed water.

In another embodiment described herein, a method for disposing of concentrated salty water includes mixing brackish concentrate and sea water concentrate to produce a mixed concentrate and outputting the mixed concentrate to an ocean.

In another embodiment described herein, a desalination plant includes a first input coupled to a source of brackish concentrate, a second input coupled to a source of sea water, a mixer coupled to the first input and the second input for mixing the brackish concentrate and the sea water to produce a mixed water, and a desalination unit for desalinating the mixed water to produce a permeate having a lower salt concentration than the mixed water and a concentrate having a higher salt concentration than the mixed water.

In another embodiment described herein, a system for desalinating salty water includes a brackish desalination plant and a seawater desalination plant. The brackish desalination plant includes a first input coupled to a source of brackish water, a desalination unit for desalinating the brackish water to produce a first permeate having a lower salt concentration than the brackish water and a first concentrate having a higher salt concentration than the brackish water, and a first output for outputting the concentrate. The seawater desalination plant includes a second input coupled to the first output for inputting the brackish concentrate into the second desalination plant, a third input coupled to a source of sea water, a mixer coupled to the first input and the second input for mixing the brackish concentrate and the sea water to produce a mixed water, a desalination unit for desalinating the mixed water to produce a second permeate having a lower salt concentration than the mixed water and a second concentrate having a higher salt concentration than the mixed water, and a second output coupled to an ocean for outputting the second concentrate to the ocean.

These and other features and advantages of the invention will be more clearly understood from the following detailed description and drawing of an embodiment of the present invention.

DETAILED DESCRIPTION OF PREFERRED EMBODIMENTS

Figure 1:
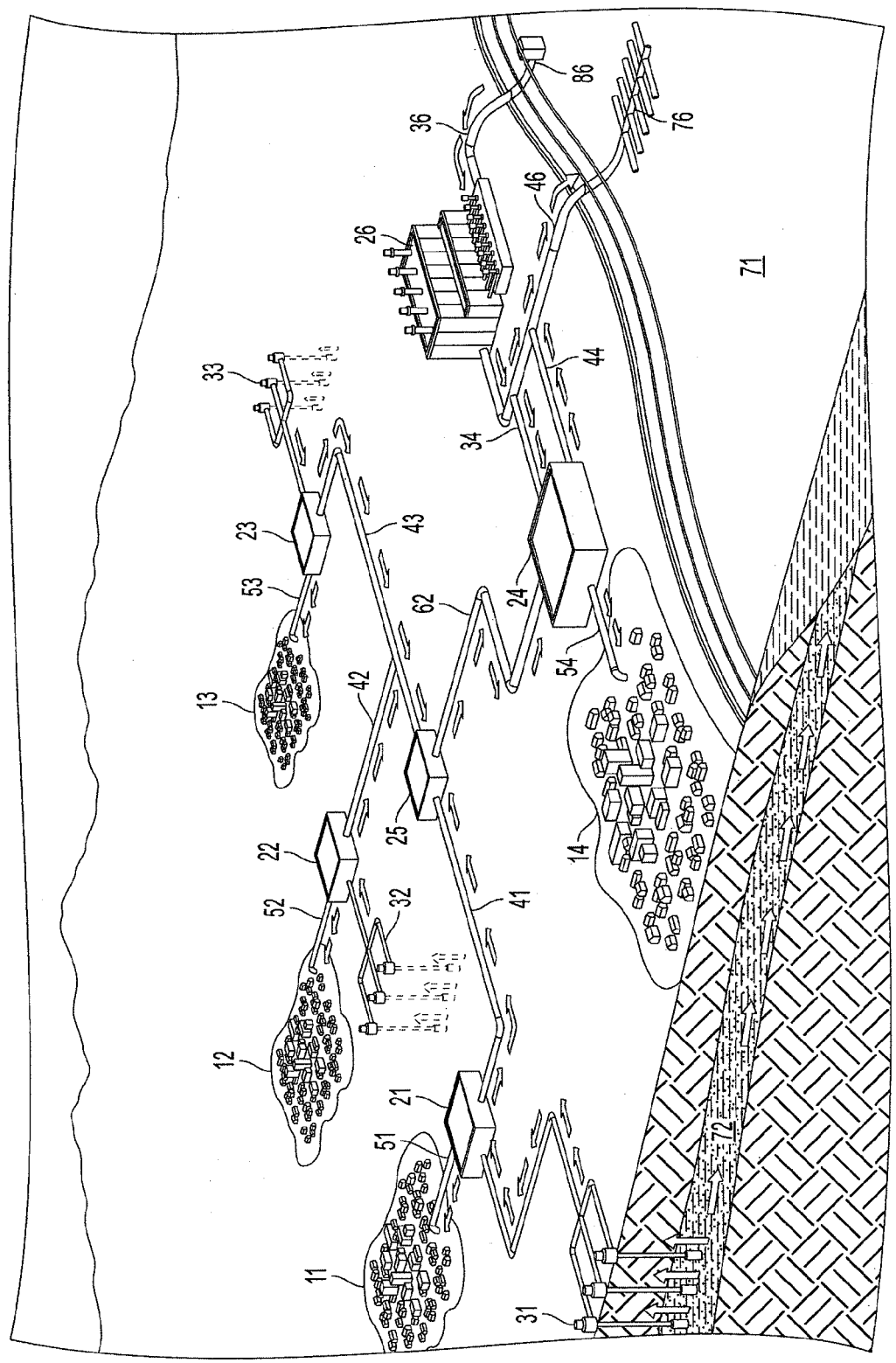
FIG. 1 is a schematic illustration of a desalination system according to an embodiment described herein.

In the following detailed description, reference is made to the accompanying drawings which form a part hereof, and in which are shown by way of illustration of specific embodiments that may be practiced. These embodiments are described in sufficient detail to enable those of ordinary skill in the art to make and use them, and it is to be understood that structural or procedural changes may be made to the specific embodiments disclosed herein.

Embodiments disclosed herein provide method and apparatus for efficient and economical treatment and disposal of brackish saline concentrate (brackish brine) generated at brackish water desalination plants. An efficiency is derived from blending the brackish desalination plant concentrate with ocean seawater or seawater concentrate that has a higher salt concentration than the brackish concentrate, in a specific proportion that reduces or eliminates the toxicity of the brackish concentrate to marine life, and to treat the seawater/brackish concentrate blend in a seawater desalination plant in a cost-effective manner using reverse osmosis membranes. The blend of brackish concentrate and seawater is purified in the seawater desalination plant and used for production of potable water. The salts contained in the brackish concentrate are detoxified by the seawater desalination plant treatment process and disposed of via the plant concentrate. The combined treatment of brackish concentrate and seawater of higher salt content than the brackish concentrate results in a more economical operation of the seawater desalination plant than treatment of seawater alone because the lower salinity brackish concentrate reduces the overall desalination plant feed water salinity thereby increasing the amount of potable water that can be produced from the same volume of seawater and reducing the amount of electrical energy needed to purify the water.

As used herein, the term "ocean" refers to any body of water that contains seawater. As used herein, the term "seawater" refers to water having a total dissolved solids concentration between about 33,500 to 35,000 mg/L. As used herein, the term "brackish water" refers to water having a total dissolved solids (TDS) concentration below about 15,000 mg/L. As used herein, the term "concentrate" refers to water output from a desalination process that has a higher salt concentration than the water input to the desalination process. It should be understood that the term "concentrate" also encompasses water including concentrate mixed with other types of water, such as other wastewaters. As used herein, the term "permeate" refers to water output from a desalination process that has a lower salt concentration than the water input to the desalination process. It should be understood that the term "permeate" also encompasses water including permeate mixed with other types of water. The main factor that governs the brackish concentrate toxicity is the ratio of the concentration of one or more key ions (calcium, magnesium, fluoride, strontium, sodium, chloride, potassium, sulfates, and bicarbonates) in the brackish concentrate and the total dissolved solids (TDS) concentration of the concentrate (ion/TDS ratio). If the ion/TDS ratio for one or more of these key ions contained in the brackish concentrate is above a certain threshold value, the concentrate exhibits toxicity to aquatic life in the vicinity of the discharge. If the ion/TDS ratio is lowered below a certain level by either removing the ion from the concentrate solution by precipitation or absorption or by increasing the concentrate salinity, the brackish concentrate becomes nontoxic.

For example, if a standard whole effluent toxicity test organisms (mysid shrimp) is exposed to brackish concentrate that contains calcium ion of 500 mg/L and has a TDS concentration of 10,000 mg/L (i.e. an ion/TDS ratio of (500 mg/L)/(10,000 mg/L)=0.05), the concentrate causes mortality of 100% of the test organisms (See, for example, Mickley and Associates, 2000, supra). When the concentrate TDS concentration, however, is increased to 20,000 mg/L at the same calcium ion concentration (500 mg/L) the testing organisms survive—i.e. the increase in concentrate TDS concentration renders the same brackish concentrate non-toxic by decreasing the ion/TDS ratio below the threshold value for calcium ion of 0.05. Using this principle, brackish concentrate can be detoxified cost-effectively by mixing it with seawater or higher-salinity concentrate generated during seawater desalination with reverse osmosis membranes in a certain mixing ratio. This mixing ratio depends on a number of factors, including the TDS concentrations of the brackish concentrate and the seawater, and the concentration of the major ions in the brackish concentrate. Various embodiments described herein provide a process and compositions for treatment of brackish concentrate toxicity by mixing the brackish concentrate with seawater from a seawater desalination plant of higher TDS concentration at a ratio that renders it non-toxic. Seawater and seawater concentrate do not exhibit toxicity and at the same time they have a significantly higher TDS concentration than the brackish concentrate, which allows blending of the two streams to render the brackish concentrate non-toxic and acceptable for direct discharge to surface waters. Because the main mechanism by which seawater and seawater concentrate render the brackish concentrate non-toxic is a balance of the ratios between the concentrations of the major ions in the brackish concentrate and the total brine TDS concentration, the brackish concentrate treatment may be achieved by either the direct mixing of the brackish concentrate and the seawater concentrate, or by mixing of the brackish concentrate with seawater and then treating the blend of seawater and brackish concentrate through a desalination process such as a reverse osmosis desalination installation. Treatment of a blend of brackish concentrate and seawater having a higher salt concentration than the brackish concentrate, is more economical than desalination of seawater alone or direct blending of brackish concentrate and seawater concentrate because the lower salinity brackish concentrate decreases the overall salinity of the seawater treated by reverse osmosis and thereby reduces the overall operations and construction costs for seawater desalination. Operations costs are reduced because the energy needed for separation of the seawater salts from the purified water is proportional to the desalination plant feed water salinity—i.e. lower salinity results in lower power demand. Desalination plant construction cost is reduced because lower feed water salinity allows producing more purified water from the same volume of treated seawater.

Refer, to FIG. 1, there being shown a costal desalination system according to a preferred embodiment. Desalination processes for producing purified water from salty water (e.g., seawater) some other salty (or brackish water source) mixed with brackish concentrate. FIG. 1 shows inland desalination plants which purify salty (brackish) water from a brackish water source, e.g., a brackish water aquifer. FIG. 1 also shows inland desalination plants providing brackish concentrate as output and feed of this concentrate to a coastal desalination plant. FIG. 1 shows a coastal desalination plant which purifies salty water from a salty water source, e.g., an ocean or a sea, and from brackish concentrate received from at least one inland brackish desalination plant.

As shown in FIG. 1, a series of pumps and pipes 31, 32, 33 draw brackish water from a source of brackish water, for example, an underground brackish aquifer 72, and transport the brackish water to one or more brackish desalination plants 21, 22, 23. In one embodiment, the brackish desalination plants are located inland and away from an ocean 71, but with access to the brackish aquifer 72.

The brackish desalination plants 21, 22, 23 desalinate the brackish water to produce a permeate having a salt concentration lower than the salt concentration of the brackish water and a concentrate having a salt concentration higher than the salt concentration of the brackish water. The brackish desalination plants 21, 22, 23 may be reverse osmosis treatment plants, membrane softening plants, electrodialysis desalination plants, and electrodialysis reversal treatment plants, distillation plants, and the like. The permeate may be sent to municipalities 11, 12, 13 via a series of pumps and pipes 51, 52, 53 for use as potable water or may be used for agriculture or industry. The concentrate may be sent to a waste water treatment facility 25 via a series of pumps and pipes 41, 42, 43.

The brackish concentrate from the various brackish desalination plants 21, 22, 23 may be combined at the waste water treatment plant 25 and sent to a seawater desalination plant 24. In other embodiments, the brackish concentrate may be sent directly to the seawater desalination plant 24 or may be combined at other convenient locations in the system to minimize the need for new or redundant pipes. In one embodiment, the pumps and pipes 41, 42, 43 used to transport the brackish concentrate to the wastewater treatment plant 25 may be part of a preexisting system formerly used to transport the brackish concentrate to the wastewater treatment plant 25 for disposal. In this case, a new system of pipes and pumps 62 may be needed to transport the brackish concentrate to the seawater desalination plant 24. In one embodiment, the operators of the seawater desalination plant 24 may charge a fee to the brackish desalination plants 21, 22, 23 and/or the wastewater treatment plant 25 for accepting the brackish concentrate.

Since the brackish concentrate will be put to beneficial use, rather than being treated as a significant disposal burden, as it is at present, concentrate from brackish inland desalination plants will become a valuable resource, which will reduce the operational costs of the brackish water desalination plants 21, 22, 23 and at the same time will enhance the affordability of seawater desalination. Diverting concentrate from exiting wastewater treatment plant ocean outfalls will enhance the available outfall capacity and thereby would decrease wastewater treatment and disposal costs, especially if the wastewater treatment plant capacity is limited by outfall discharge capacity availability.

Figure 2:
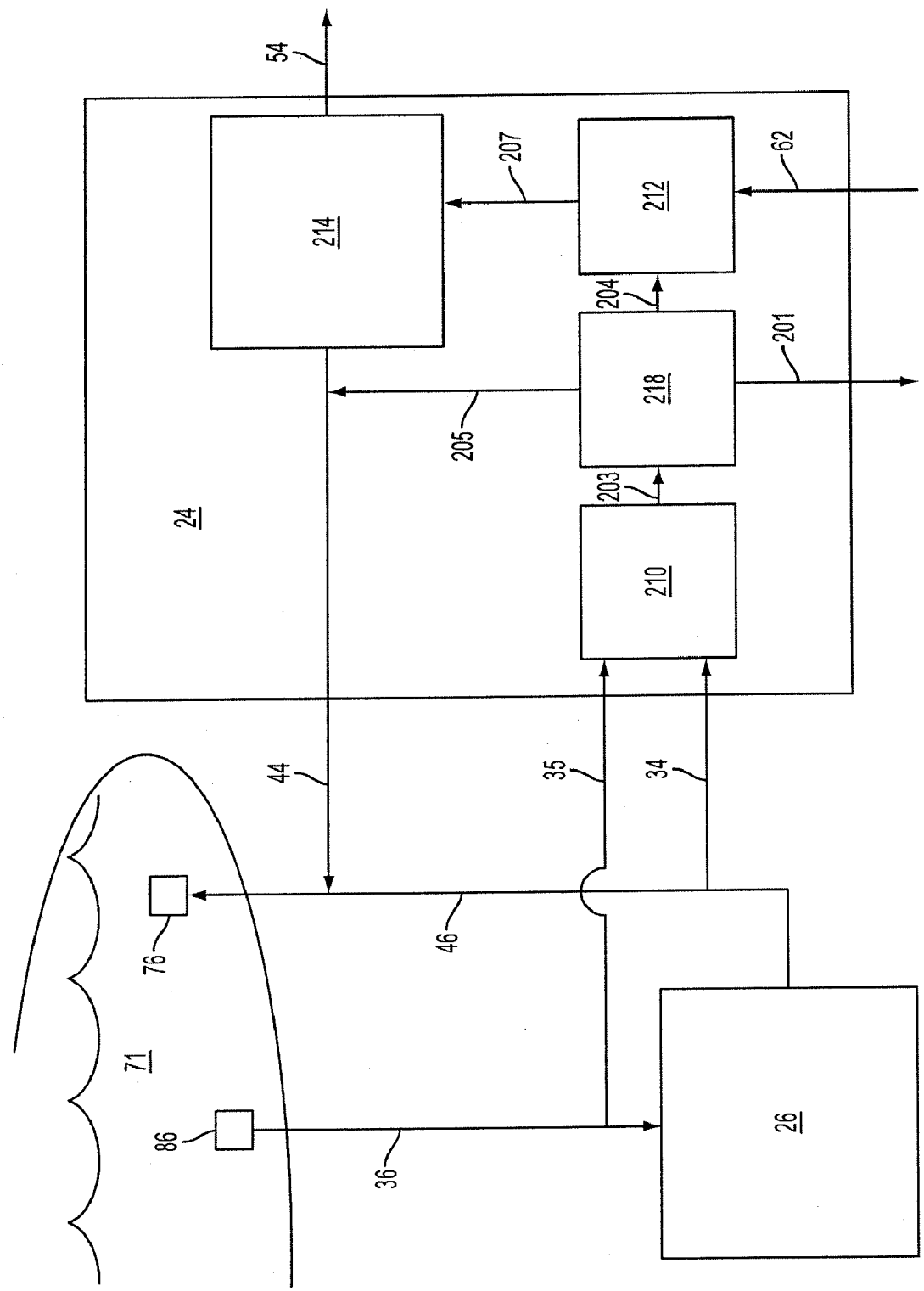
FIG. 2 is a diagram of a desalination system according to another embodiment described herein.

The seawater desalination plant 24 receives the brackish concentrate from the brackish desalination plants 21, 22, 23 and receives seawater from the ocean 71. In one embodiment, the seawater may be provided from a power plant 26 located near the seawater desalination plant via a system of pipes and pumps 46 exiting the power plant 26 as described in further detail in U.S. Pat. No. 6,946,081, the disclosure of which is incorporated herein in its entirety. The power plant 26 may draw the seawater through an inlet 86 located in the ocean 71 and convey the seawater to the power plant 26 by input pipes and pumps 36. The power plant 26 may then use the seawater in a cooling system or other process to raise the seawater above ambient temperature using waste heat before providing the seawater to the seawater desalination plant 24 through a series of pipes and pumps 34. The waste heat from the power plant 26 may save energy by raising the temperature of the seawater to a desirable temperature without expending excess energy by the seawater desalination plant 24. In another embodiment, a portion or all of the seawater may bypass the power plant 26 and be sent directly to the desalination plant 24 by a diverting series of pipes 35 (FIG. 2). In yet another embodiment, the seawater desalination plant 24 may obtain seawater through its own independent inlet (not shown) not connected to a power plant 26. Seawater used by the power plant 26 and not sent to the seawater desalination plant 24 may be returned to the ocean 71 by a series of pipes and pumps 46 to an outlet 76 or series of dispersing outlets located in the ocean 71.

The seawater and the brackish concentrate are received by and mixed at the seawater desalination plant 24 to produce a mixed water as described below in greater detail with respect to FIG. 2. In other embodiments, the brackish concentrate and seawater may be mixed at other convenient locations and the mixed water may be supplied to the seawater desalination plant 24. Typically, inland desalination plants have been set up to desalinate salty water from a brackish water source and are not set up to desalinate salty water from a sea or ocean. Typically, coastal desalination plants have been set up to desalinate salty water from a sea or ocean. Thus, beyond the receiving of and mixing of the brackish concentrate with the salty water from an ocean or sea, the coastal desalination plant should not require any significant modifications to the purifying process to desalinate the mixed brackish concentrate with the salty water from an ocean or sea. A benefit of the integrated desalination system of the present invention is that under suitable conditions it could yield a reduction of the costs for production of fresh water from saline sources and reduce costs for brackish concentrate disposal.

The seawater desalination plant 24 may desalinate the mixed water to produce a mixed permeate having a salt concentration lower than that of the mixed water and a mixed concentrate having a salt concentration higher than that of the mixed water. The seawater desalination plant 24 may desalinate the mixed water using a reverse osmosis method, a membrane softening method, an electrodialysis desalination method, an electrodialysis reversal method, a distillation method, or some combination thereof. The mixed permeate may be sent to a municipality 14 via a series of pumps and pipes 54 for use as potable water or may be used for agriculture or industry. The mixed concentrate may be output from the seawater desalination plant 24 via a series of pipes and pumps 46 and may be disposed of to the ocean using the pipes 46 and outlet 76 of the power plant 26. In another embodiment, the mixed concentrate may be output to an outlet 76 not connected to a power plant 26 (not shown).

FIG. 2 is a diagram of a desalination system according to another embodiment described below. As shown in FIG. 2, seawater is drawn from the ocean 71 through an inlet 86 located in the ocean 71 and conveyed to the power plant 26 by input pipes and pumps 36. The power plant 26 may then use the seawater in a cooling system or other process to raise the seawater above ambient temperature using waste heat before providing the seawater to the seawater desalination plant 24 through a series of pipes and pumps 34. Alternatively, all of the seawater may bypass the power plant 26 and be sent directly to the desalination plant 24 by a diverting series of pipes 35. In another embodiment, ambient temperature seawater directly from the ocean 71 and the heated seawater from the power plant 26 may be mixed in a mixer 210 in a proportion to achieve a desired temperature of the seawater suitable for the desalination process.

After blending, the seawater enters a pretreatment process 218 through line 203 wherein the seawater undergoes an initial filtering process. In this step, the seawater is separated into solids, usable water, and undesirable water. Unusable water leaves the pretreatment process 218 and is discharged through a pretreatment unusable water line 205. Solids that result from the pretreatment process 218 may be delivered to landfill through a pretreatment solid waste line 201. The remaining usable seawater leaves through a filtered feed water line 204.

The filtered seawater and the brackish concentrate from line 62 are mixed in a mixer 212 to produce a mixed water output through line 207. The ratio of brackish concentrate to seawater mixed in mixer 212 may be adjusted in such a way so that the resulting mixed concentrate after desalination is non-toxic to sea life. This ratio needed to render the resulting mixed concentrate non-toxic depends on the actual mineral mix in the brackish concentrate and seawater. Adding fresh water does not change the mineral balance significantly, but instead only dilutes the water. The main factor that governs the brackish concentrate toxicity is the ratio of the concentration of one or more key ions (calcium, magnesium, fluoride, strontium, sodium, chloride, potassium, sulfates, and bicarbonates) in the brackish concentrate and the total dissolved solids (TDS) concentration of the concentrate (ion/TDS ratio). If the ion/TDS ratio for one or more of these key ions contained in the brackish concentrate is above a certain threshold value, the concentrate exhibits toxicity to aquatic life in the vicinity of the discharge. If the ion/TDS ratio is lowered below a certain level by increasing the concentrate salinity by adding seawater or seawater concentrate, the brackish concentrate becomes nontoxic.

For example, if a standard whole effluent toxicity test organisms (mysid shrimp) is exposed to brackish concentrate that contains calcium ion of 500 mg/L and has a TDS concentration of 10,000 mg/L (i.e. an ion/TDS ratio of (500 mg/L)/(10,000 mg/L)=0.05), the concentrate causes mortality of 100% of the test organisms (See, for example, Mickley and Associates, 2000, supra). When the concentrate TDS concentration, however, is increased to 20,000 mg/L at the same calcium ion concentration (500 mg/L) the testing organisms survive—i.e. the increase in concentrate TDS concentration renders the same brackish concentrate non-toxic by decreasing the ion/TDS ratio below the threshold value for calcium ion of 0.05. Using this principle, brackish concentrate can be detoxified cost-effectively by mixing it with seawater or seawater concentrate in a certain mixing ratio. This mixing ratio depends on a number of factors, including the TDS concentrations of the brackish concentrate and the seawater, and the concentration of the major ions in the brackish concentrate.

Therefore, in one embodiment, the brackish concentrate may have a lower salt concentration than that of the seawater. In one embodiment, the brackish concentrate may have a total dissolved solids of about 2,000 to 5,000 mg/L and the seawater may have a total dissolved solids concentration of about 33,500 to 35,000 mg/L.

The combined treatment of brackish concentrate and seawater having a higher salt concentration than the brackish concentrate results in a more economical operation of the seawater desalination plant 24 than desalination of seawater alone or direct blending of brackish concentrate and seawater concentrate because the lower salinity brackish concentrate decreases the overall salinity of the mixed water. Operations costs are reduced because the energy needed for separation of the seawater salts from the purified water is proportional to the desalination plant feed water salinity—i.e. lower salinity results in lower power demand. Desalination plant construction cost is reduced because lower feed water salinity allows for an increased plant production capacity to produce more purified water from the same volume of treated seawater. Increased plant production capacity means producing more fresh water from the same amount of feed seawater, which in turns yields lower fresh water production costs. By practicing various embodiments described herein, the capacity of existing seawater desalination plants can be increased by about 10 to 20% by replacing some of the source seawater fed to the desalination plant with brackish concentrate.

In another embodiment, the content of chemicals and pathogens in the brackish concentrate need to be taken into account in determining the mix of brackish concentrate to sea water, because there may be regulatory limits on the concentrations of such in the discharge to the sea and in the drinking waters produced from the mixed waters. In another embodiment, the brackish concentrate may contain antiscalants added at the brackish desalination plants 21, 22, 23, which may reduce or eliminate the need for additional antiscalants to be added at the seawater desalination plant 24. The proportion of brackish concentrate to seawater should not be too high because the mix of minerals in brackish is different from the mix of minerals in seawater and too much brackish concentrate may adversely affect (be toxic to) sea life. In one embodiment, no more than 40% brackish concentrate is mixed with at least 60% sea water so that the content of seawater changes the mineral balance enough to make it tolerable for sea life. This ratio depends on the actual brackish concentrate and sea water mineral mixes. Adding fresh water does not change the mineral balance significantly, only dilutes the water. In an aspect, the content of chemicals and pathogens in the concentrate need to be taken into account in determining the mix of brackish concentrate to sea water, because there may be regulatory limits on the concentrations of such in the discharge to the sea and in the drinking waters produced from the mix.

The mixed water is then sent to the desalination unit 214 through line 207 where the mixed water is separated into a mixed permeate and a mixed concentrate. The desalination unit may include a reverse osmosis system, a membrane softening system, an electrodialysis desalination system, an electrodialysis reversal system, a distillation system, or some combination thereof. The mixed permeate may be output through line 54. The mixed concentrate may be output from the seawater desalination plant 24 through line 46 and may be disposed of to the ocean using the pipes 46 and outlet 76 of the power plant 26. In another embodiment, the mixed concentrate may be output to an outlet 76 not connected to a power plant 26 (not shown).

Figure 3:
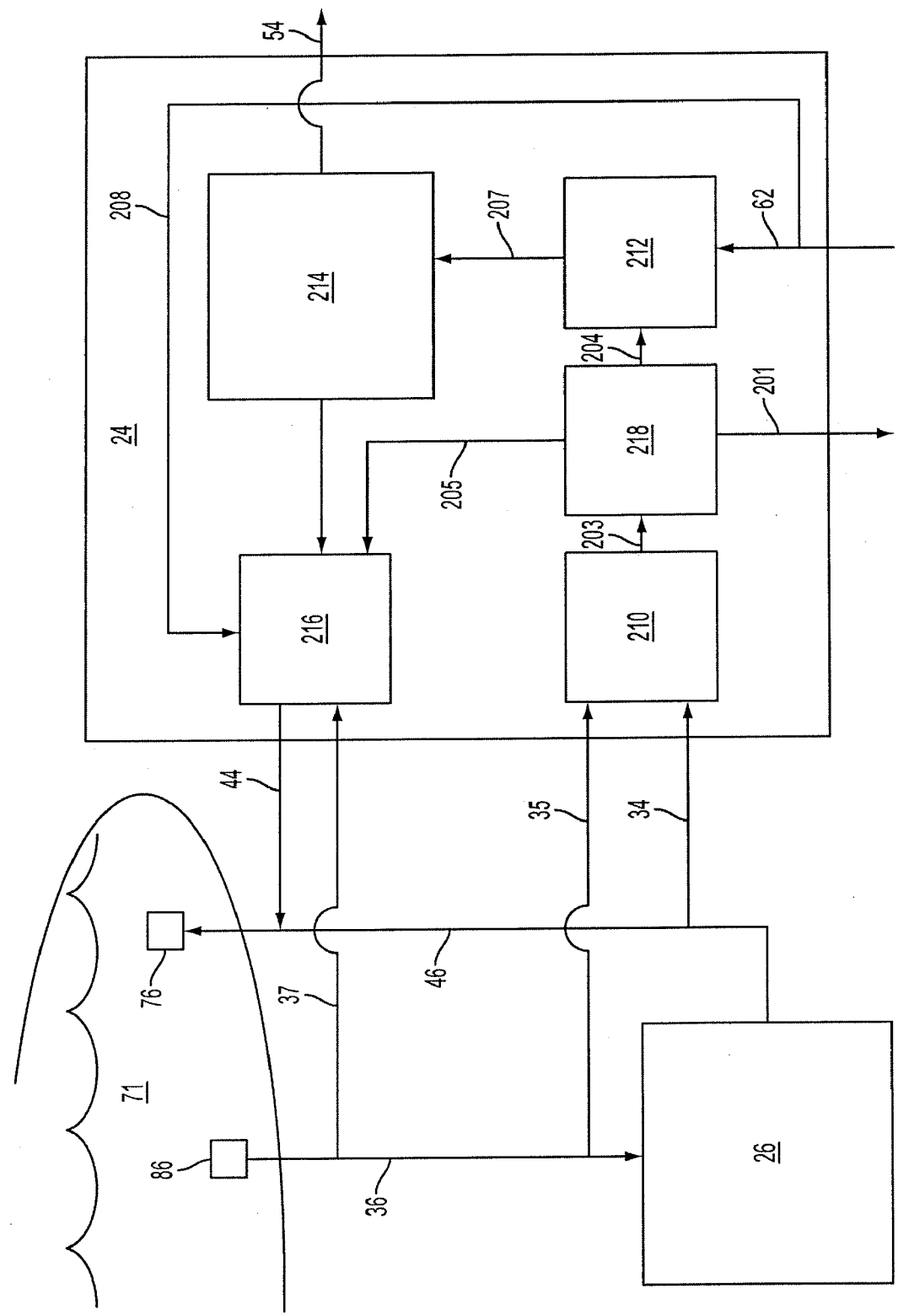
FIG. 3 is a diagram of a desalination system according to yet another embodiment described herein.

FIG. 3 is a diagram of a desalination system according to yet another embodiment described below. The desalination system of FIG. 3 differs from the system of FIG. 2 in that it includes a second mixer 216 and a bypass line 208 for sending some or all of the concentrated brine to the mixer second 216, thereby bypassing the desalination unit 214. In the desalination system of FIG. 3, the concentrated brine enters the seawater desalination plant 24 by line 64. The concentrated brine may then be divided between line 64, which continues to the mixer 212, and line 208, which diverts the concentrated brine from the desalination unit 214 and sends the concentrated brine to the second mixer 216 where it is mixed with concentrate from the desalination unit.

In one embodiment, all of the concentrated brine may be diverted to the second mixer 216 so that the desalination unit desalinates only seawater and produces a seawater concentrate. The seawater concentrate is then mixed in a ratio with the brackish concentrate in the second mixer 216 that renders the brackish brine non-toxic to marine life. In another embodiment a portion of the concentrated brine may be mixed with the seawater in mixer 212 and desalinated in desalination unit 214 and another portion of the concentrated brine may be diverted to the second mixer 216 to be mixed with the mixed concentrate. In yet another embodiment, as described above, all of the brackish concentrate may be mixed with seawater in the mixer 212 and desalinated in the desalination unit 214. In any of the above embodiments, an amount of either filtered seawater from line 205 or an amount of unfiltered seawater through line 37 may be added to the various concentrates in the second mixer 216 to adjust the concentration of salt to render the concentration non-toxic to marine life. The mixed concentrate is then output from the seawater desalination plant 24 through line 64 and output to the ocean 71 through line 46 and outlet 76.

A number of benefits, in addition to those discussed above, may be gained by practice of the various embodiments described above, including reducing the costs for production of potable water from saline sources and reducing costs for brackish concentrate disposal.

Concentrate from inland brackish desalination plants, as compared to wastewater, typically does not contain pathogens (bacteria, *Giardia, Cryptosporidium*, etc.) and therefore, it could be a safe and suitable source of water for seawater desalination. As a result, rather than being disposed as a waste product to the ocean or to deep aquifers, brackish brine could be reused for drinking water production.

Brine from inland brackish desalination plants usually has an order-of-magnitude lower total dissolved solids (TDS) concentration than seawater (e.g., 2,000 to 5,000 mg/L vs. 33,500 to 35,000 mg/L). As a result, mixing of brackish concentrate and seawater will reduce the overall salinity of the source water fed to the seawater desalination plant, and therefore, will decrease the total amount of energy needed to desalinate seawater. Energy use decrease is proportional to the decrease in the source water salinity.

Usually concentrate from inland brackish desalination plants contains antiscalants, which will allow to reduce or to completely eliminate the expenditures for addition of such chemicals at the seawater desalination plant and will therefore, increase the production capacity of the desalination plant. Increased plant production capacity means producing more fresh water from the same amount of feed seawater, which in turns yields lower fresh water production costs. This also means that the capacity of existing seawater desalination plant can be increased with 10 to 20% by replacing some of the source seawater fed to the desalination plant with brackish concentrate. Additionally, by replacing some of the source seawater with concentrate from brackish desalination plants, the total amount of new seawater that needs to be collected for the desalination plant operations will be reduced proportionally, which would lower impingement and entrainment of marine organisms associated with collection of ocean water for seawater desalination.

Since the brackish concentrate will be put to beneficial use, rather than being treated as a significant disposal burden, as it is at present, concentrate from brackish inland desalination plants will become a valuable resource, which will reduce the operational costs of the brackish water desalination plants and at the same time will enhance the affordability of seawater desalination.

Diverting concentrate from exiting WWTP ocean outfalls will enhance the available outfall capacity and thereby would decrease wastewater treatment and disposal costs, especially if the WWTP capacity is limited by outfall discharge capacity availability.

Integrated brackish concentrate/seawater treatment will also result in reduction of the overall discharge volume and salinity of existing seawater desalination plants, which in turn will yield environmental benefits.

While embodiments have been described in detail in connection with the embodiments known at the time, it should be readily understood that the claimed invention is not limited to the disclosed embodiments. Rather, the embodiments can be modified to incorporate any number of variations, alterations, substitutions or equivalent arrangements not heretofore described. For example, although various embodiments described above disclose a combination of a desalination plant for purifying seawater collocated with a coastal power generation plant, the invention is not so limited, and an integrated system can also be used for desalination plants with separate intakes and outfalls. Furthermore, the invention does not depend on a desalination plant for purifying inland water being co-located or co-generated with a desalination plant for purifying seawater. The invention is not limited to membrane desalination plants and can be applied to thermal desalination plants as well. Additionally, in various embodiments, changes could be made to the desalination system including varying the number and type of membranes utilized the use of nanofiltration, varying water pressure, and the mixed use of natural and reverse osmotic approaches. Moreover, although described as referring to seawater, the various embodiments are not limited and can be used for desalination plants that purify any source of salty water.

What is claimed as new and desired to be protected by Letters Patent of the United States is:

1. A method for purifying water, comprising the steps of: mixing brackish desalination concentrate originating from a brackish source, after providing the brackish concentrate to a wastewater treatment plant, and sea water to produce mixed water, wherein the brackish concentrate has a salt concentration that is less than a salt concentration of the sea water; and desalinating the mixed water at a first desalination plant to produce a permeate having a lower salt concentration than the mixed water and a concentrate having a higher salt concentration than the mixed water.

2. The method of claim 1, wherein the brackish concentrate is provided by a second desalination plant that desalinates brackish water to produce the brackish concentrate.

3. The method of claim 2, wherein the brackish water is from an inland brackish water aquifer.

4. The method of claim 2, wherein the brackish concentrate is provided by a plurality of brackish water desalination plants that desalinate brackish water to produce the brackish concentrate.

5. The method of claim 1, wherein the brackish concentrate is formed by concentrating brackish water having a total dissolved solids concentration below 15,000 mg/L.

6. The method of claim 1, wherein the brackish concentrate has a total dissolved solids concentration between about 2,000 to about 5,000 mg/L.

7. The method of claim 1, further comprising charging a fee to receive the brackish concentrate at the first desalination plant.

8. The method of claim 1, further comprising desalinating the mixed water by reverse osmosis.

9. The method of claim 1, further comprising desalinating the mixed water by a thermal desalination process.

10. The method of claim 1, wherein the concentrate does not exhibit toxicity to marine life.

11. The method of claim 1, wherein the brackish concentrate and sea water is mixed in a specific proportion that causes the concentrate to be non-toxic to marine life.

12. The method of claim 1, wherein the permeate is potable water.

13. The method of claim 1, further comprising outputting the concentrate to an outlet of the first desalination plant.

14. The method of claim 13, wherein the outlet of the first desalination plant exits to an ocean.

15. The method of claim 1, wherein the concentrate includes one or more ions selected from the group consisting of calcium, magnesium, fluoride, strontium, sodium, chloride, potassium, sulfates, and bicarbonates, and wherein the ratio of each of the ions to the total dissolved solids is not toxic to marine life.

16. The method of claim 1, wherein the concentrate has a higher total dissolved solids concentration than the brackish concentrate.

17. The method of claim 1, wherein the first desalination plant is a costal desalination plant.

18. The method of claim 1, wherein the mixed water comprises no more than 40% of the brackish concentrate.

19. The method of claim 1, wherein the mixed water comprises about 40% brackish concentrate and about 60% sea water.

20. The method of claim 1, wherein the brackish concentrate has a lower salinity than the seawater.

21. The method of claim 1, wherein the brackish concentrate comprises antiscalants.

22. The method of claim 1, further comprising heating at least a portion of the sea water in a power plant cooling system before mixing the sea water with the brackish concentrate.

23. A method for purifying water, comprising the steps of: receiving a first salty desalination concentrate water having a total dissolved solids concentration of less than 33,500 mg/L, that has been provided to a wastewater treatment plant after having been desalinated, at a first desalination plant; receiving a second salty water having a total dissolved solids concentration equal to or greater than 33,500 mg/L at the first desalination plant; mixing the first salty water and the second salty water to produce a mixed water; desalinating the mixed water at the first desalination plant to produce a potable permeate having a total dissolved solids concentration that is lower than the mixed water and a concentrate having a total dissolved solids concentration that is higher than the mixed water; and outputting the concentrate through an output of the first desalination plant.

24. The method of claim 23, wherein the first salty water is produced at a second desalination plant by desalinating a third salty water having a total dissolved solids concentration of less than about 15,000 mg/L.

25. The method of claim 23, wherein the second salty water has a total dissolved solids concentration of about 2,000 to 5,000 mg/L.

26. The method of claim 23, wherein the concentrate does not exhibit toxicity to marine life.

27. The method of claim 23, wherein the mixed water comprises less than 40% of the first salty water.

28. The method of claim 23, further comprising heating at least a portion of the second salty water in a power plant before mixing the first salty water with the second salty water.

29. A method of producing potable water from a salty water comprising: providing brackish water to a first desalination plant; desalinating the brackish water at the first desalination plant to produce a first concentrate having a higher salt content than the brackish water and a lower salt content than sea water and a first permeate having a lower salt concentration than the brackish water; providing the first concentrate to a wastewater treatment plant and then providing the first concentrate to a second desalination plant; providing sea water to the second desalination plant; mixing the first concentrate with the sea water to produce a mixed water; and desalinating the mixed water at the second desalination plant to produce a second concentrate having a higher salt content than the mixed water and a second permeate having a lower salt concentration than the mixed water.

30. The method of claim 29, further comprising mixing the first concentrate with brackish concentrates from a plurality of brackish desalination plants at the wastewater treatment plant.

31. The method of claim 29, further comprising charging a fee to receive the first concentrate at the second desalination plant.

32. The method of claim 29, wherein the mixed water comprises no more than 40% of the first concentrate.

33. A method for disposing of concentrated salty water, comprising the steps of: mixing brackish desalination concentrate originating from desalination of a brackish source and sea water desalination concentrate to produce a mixed concentrate; and outputting the mixed concentrate to an ocean comprising sea water, wherein the brackish concentrate has a lower salt concentration than the sea water and the sea water concentrate has a higher salt concentration than the sea water.

34. The method of claim 33, wherein the brackish concentrate is produced at a first desalination plant by desalinating brackish water, and wherein the sea water concentrate is produced at a second desalination plant by desalinating sea water.

35. The method of claim 34, further comprising: mixing the brackish concentrate with the sea water concentrate at the second desalination plant; and outputting the mixed concentrate to the ocean through an output of the second desalination plant.

36. The method of claim 35, wherein the brackish concentrate is provided to a wastewater treatment plant from the first desalination plant, and wherein the brackish concentrate is provided to the second desalination plant from the wastewater treatment plant.

37. The method of claim 36, wherein the brackish concentrate is mixed with brackish concentrates from a plurality of brackish water desalination plants at the wastewater treatment plant.

38. The method of claim 33, wherein the mixed concentrate comprises less than 40% of the brackish concentrate.

39. A desalination system comprising: a first input coupled to a wastewater treatment plant that receives brackish concentrate from a unit that desalinates brackish water to produce the brackish concentrate; a second input coupled to a source of sea water, wherein the brackish concentrate has a salt concentration that is less than a salt concentration of the sea water; a mixer coupled to the wastewater treatment plant and the second input for mixing the brackish concentrate and the sea water to produce a mixed water; and a desalination unit for desalinating the mixed water to produce a permeate having a lower salt concentration than the mixed water and a concentrate having a higher salt concentration than the mixed water.

40. The desalination system of claim 39, wherein the brackish water desalination unit is comprised in a second desalination plant that desalinates brackish water to produce the brackish concentrate.

41. The desalination system of claim 40, wherein the first input is coupled to a plurality of brackish water desalination plants that desalinate brackish water to produce the brackish concentrate.

42. The desalination system of claim 39, wherein the brackish concentrate has a total dissolved solids concentration of less than 30,000 mg/L.

43. The desalination system of claim 39, wherein the desalination unit comprises a reverse osmosis membrane.

44. The desalination system of claim 39, wherein the desalination unit comprises a thermal desalination unit.

45. The desalination system of claim 39, further comprising an output coupled to a potable water supply to provide the permeate to the potable water supply.

46. The desalination system of claim 39, further comprising an output coupled to an ocean to provide the concentrate to the ocean.

47. The desalination system of claim 39, wherein the brackish concentrate comprises antiscalants.

48. The desalination system of claim 39, wherein the second input is coupled to the output of a cooling system of a power plant.

49. A system for desalinating salty water comprising: a brackish desalination plant comprising: a first input coupled to a source of brackish water, a desalination unit for desalinating the brackish water to produce a first permeate having a lower salt concentration than the brackish water and a first concentrate having a higher salt concentration than the brackish water and a lower salt concentration than sea water, and a first output for outputting the concentrate coupled to a wastewater treatment plant; and a seawater desalination plant comprising: a second input coupled to the wastewater treatment plant first output for inputting the brackish concentrate into the second desalination plant, a third input coupled to a source of sea water,
 a mixer coupled to the first input and the second input for mixing the brackish concentrate and the sea water to produce a mixed water,
 a desalination unit for desalinating the mixed water to produce a second permeate having a lower salt concentration than the mixed water and a second concentrate having a higher salt concentration than the mixed water, and
 a second output coupled to an ocean for outputting the second concentrate to the ocean.

50. The desalination system of claim 49, further comprising a power plant coupled to the third input for providing sea water heated by the power plant to the third input.

51. The desalination system of claim 49, further comprising a plurality of brackish desalination plants coupled to the wastewater treatment plant for providing brackish concentrate to the wastewater treatment plant.

* * * * *